United States Patent
Olson et al.

[11] Patent Number: 6,010,222
[45] Date of Patent: Jan. 4, 2000

[54] AERODYNAMIC MIRROR EXTERIOR SHELL

[75] Inventors: M. Eugene Olson; Gregory G. Steen, both of Fort Wayne, Ind.

[73] Assignee: Navistar International Transportation Corp, Chicago, Ill.

[21] Appl. No.: 08/916,867

[22] Filed: Aug. 22, 1997

[51] Int. Cl.$^7$ ........................................... G02B 7/18
[52] U.S. Cl. ................................. 359/509; 359/507
[58] Field of Search ................................. 359/507–509, 359/512, 838, 843–844, 871

[56] References Cited

U.S. PATENT DOCUMENTS

| | | | |
|---|---|---|---|
| 4,449,796 | 5/1984 | Janssen et al. | 359/507 |
| 4,718,755 | 1/1988 | Olson et al. | 359/507 |
| 4,898,458 | 2/1990 | McDonald | 359/509 |
| 5,069,538 | 12/1991 | Shust et al. | 359/871 |
| 5,179,470 | 1/1993 | Olson | 359/509 |

FOREIGN PATENT DOCUMENTS

| | | | |
|---|---|---|---|
| 2511290 | 9/1975 | Germany | 359/507 |
| 40 39 484 | 6/1992 | Germany | 359/507 |
| 61-36036 | 2/1986 | Japan | 359/507 |

*Primary Examiner*—Thong Nguyen
*Attorney, Agent, or Firm*—Jeffrey P. Calfa; Dennis K. Sullivan

[57] ABSTRACT

An aerodynamic exterior rear view mirror for motor vehicles that has low drag as a result of prevention of laminar boundary layer separation on the mirror head and subsequent turbulent wake size reduction. The vehicle mirror comprises an aerodynamic exterior shell having a continuously smooth surface with inboard and outboard trailing edges. The surfaces of the shell preceding the trailing edges can be either parallel or closing relative to the free stream airflow. A boundary layer control device that consists of a trip strip is formed on the exterior surface of the mirror head just upstream of the transition or separation point where the laminar boundary layer flow would transition to turbulent boundary layer flow with delayed separation or to complete separation absent the boundary layer trip strip. The trip strip, when correctly sized and utilized, will assist the laminar boundary layer to transition to turbulent boundary layer flow which reenergizes the boundary layer. The turbulent boundary layer is more stable and has more energy which will enable it to adhere to the surface and allow the airflow to continue to and separate at the mirror head trailing edges. As a result separation is greatly reduced or eliminated which reduces the drag that would have been present, absent the boundary layer control device.

39 Claims, 2 Drawing Sheets

AERODYNAMIC MIRROR EXTERIOR SHELL

BACKGROUND OF THE INVENTION

This invention relates to an aerodynamic exterior rear view mirror for motor vehicles and especially for large vehicles such as trucks and busses that will enable the operator to view trailing traffic and to assist in backing up the vehicle. The exterior mirror for large trucks and busses must be supported from the vehicle at a location spaced away from the vehicle to enable the operator to see around the trailing end of the vehicle. Thus the exterior mirror is located in the vehicle created flow field and creates drag that must be overcome by thrust created by the vehicle's engine. The mirror of this invention has an aerodynamically shaped exterior mirror head that carries an adjustable mirror therein. The reflecting surface of the mirror is located within the mirror head creating a flat rear surface for the mirror head. As a result, the smooth aerodynamic surface of the mirror head comes to an abrupt halt, along trailing vertically extending edges. The abrupt end to these surfaces will result, in an idealized flow situation (frictionless flow), in the airflow continuing to the trailing edges with separation occurring at the trailing edges followed by a turbulent wake. The wake is the primary source of mirror head drag (surface friction being a small secondary drag source) and its size determines the magnitude of drag for a given free stream velocity. The size of the wake is determined by the location of the point of separation. In the idealized case, the point of separation is at the trailing edge and the size of the wake is dependent upon the attitude of the surfaces the airflow is following relative to the direction of the local free stream airflow. The term "local free stream airflow" refers to the movement of air relative to the side of the vehicle. In the actual, physical world the point of separation may be at the trailing edges of the mirror head or at some point upstream of the trailing edges and is a function of both the attitude of the surfaces that the airflow is following relative to the direction of the local free stream airflow and the characteristicsof a thin, naturally occurring, surface boundary layer. The flow field around the aerodynamic mirror head is basically laminar by nature, however, within this flow field, on the external surface of the mirror head, a thin layer of slower moving air, called a boundary layer, results from the friction created between moving air and a non-moving surface, creating friction drag which is small relative to the wake drag. This boundary layer gradually thickens as the air within flows downstream towards the mirror head trailing edges. The flow within this boundary layer is initially laminar and remains so until some surface irregularity causes a transition to a turbulent boundary layer or an adverse pressure gradient causes a localized or complete separation. The surface location of this point of separation determines the size of the downstream wake. When the inboard and outboard surfaces of the mirror head are diverging immediately prior to the trailing edges, relative to the local free stream airflow, a relatively large turbulent wake related to the divergence angle, will be created beyond the trailing edges. The boundary layer in this case will probably remain attached and separation will occur at the trailing edges. If the surfaces are parallel immediately prior to their trailing edges, relative to the direction of the local free stream airflow, and the airflow remains attached, the wake size will be reduced in size as compared to that of the diverging trailing edges with a corresponding reduction in drag. If the boundary layer separates from the surface forward (upstream) of the trailing edges, the size of the wake will increase and potentially reach or exceed the wake size of the diverging surface wake. If the surfaces are converging immediately prior to their trailing edges, relative to the direction of the local free stream airflow, and the airflow remains attached, the wake size will be substantially reduced to a wake closing size much smaller than that of the parallel trailing edges size with a correspondingly larger reduction in drag. In this situation, however, upstream boundary layer airflow separation is very likely. In all three cases, without boundary layer flow separation, the surface convergence immediately prior to their trailing edges will result in the least amount of mirror head aerodynamicdrag. In all three cases with boundary layer flow separation, the mirror head drag will be higher. The further forward the separation point, the larger the wake and the higher the drag. These high drag forces increase as the vehicle speed increases resulting in greatly increasing fuel consumption.

The U.S. Pat. No. 5,179,470 discloses the concept of providing shaped vanes that are located adjacent the trailing edges of the mirror head that function to reduce the downstream wake. However, the invention of this patent controls the size of the wake of the main mirror head body by channeling the boundary layer within the turning vane flow field thereby reducing the size of the wake to the area size of the trailing vertical edges or possibly less. However, the shape design of the vanes is very critical less they generate their own separated flow field.

The U.S. Pat. No. 5,069,538 discloses a side mounted rear view mirror for a motor vehicle that includes a small air deflector disposes upstream of the mirror housing for the purpose of creating an air stream that is smoothly channeled past the lateral edges of the mirror housing without obstructing the operators view. This rear view mirror does not prevent the problem of high draw beginning from the point where separation of laminar flow occurs to the vertically extending edges or the following turbulent wake.

For the foregoing reasons, there is a need for an aerodynamic exterior rear view mirror for motor vehicles in which separation of the airflow is eliminated or the separation point contained to a minimum distance from the trailing edges and the size of turbulent wake beyond the trailing edges is minimized resulting in a substantial drag reduction.

SUMMARY OF THE INVENTION

The present invention is directed to an aerodynamic exterior rear view mirror for motor vehicles that has low drag as a result of a reduced wake size beyond the trailing edges due to the elimination of a boundary layer separation forward of the trailing edges of the mirror head. This motor vehicle mirror comprises an aerodynamic exterior shell having a continuously smooth surface with inboard and outboard trailing edges. The surfaces of the shell preceding the trailing edges are either parallel or closing relative to the free stream airflow. A boundary layer control device that consists of a trip strip is formed on the exterior surface of the mirror head just upstream of the transition or separation point where the laminar boundary layer flow would transition to turbulent boundary layer flow absent the boundary layer trip strip. The trip strip forces the laminar boundary layer flow to transition to a turbulent boundary layer flow which in effect reenergizes the boundary layer. The turbulent boundary layer is more stable and has more energy which will enable it to adhere to the surface and continue as a boundary layer beyond the trailing edges. As a result separation is greatly reduced or eliminated which reduces the drag that would have been present, absent the boundary layer control device, by reducing the size of the turbulent wake.

DETAILED DESCRIPTION OF THE INVENTION

Figure 1:
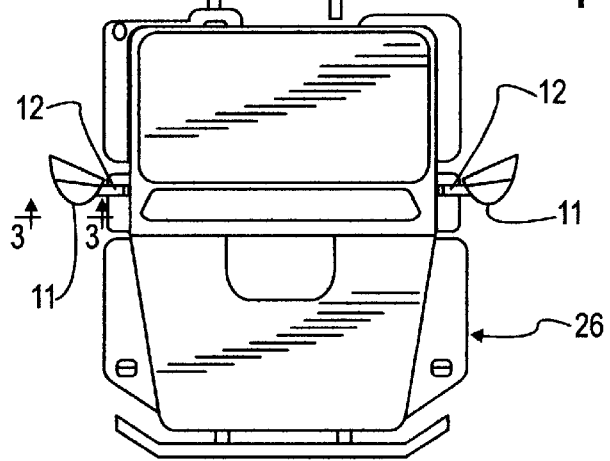
FIG. 1 is a top view of truck having a pair of mirrors that include this invention mounted thereon.

FIG. 1 is a top view of a type of vehicle 26 that the mirrors 11 of this invention are intended to be mounted upon. The mirrors 11 are secured to the vehicle 26 by mounting assemblies 12 that space the mirrors a sufficient distance away from the side of the vehicle to enable the operator to see down the side and to the rear of the vehicle 26. The vehicle 26 shown in FIG. 1 would normally be towing a lengthy trailer (not shown). The vehicle could be a bus rather than a truck.

The mirror 11 includes a housing 14 that is vertically elongated and has a generally rectangular configuration. The overall dimension of the mirror 11 is approximately 20 inches high and 10.5 wide which is of sufficiently size to create an appreciable air drag. Mirrors of this type can account for up to 4% of the total air drag of a vehicle.

Figure 4:
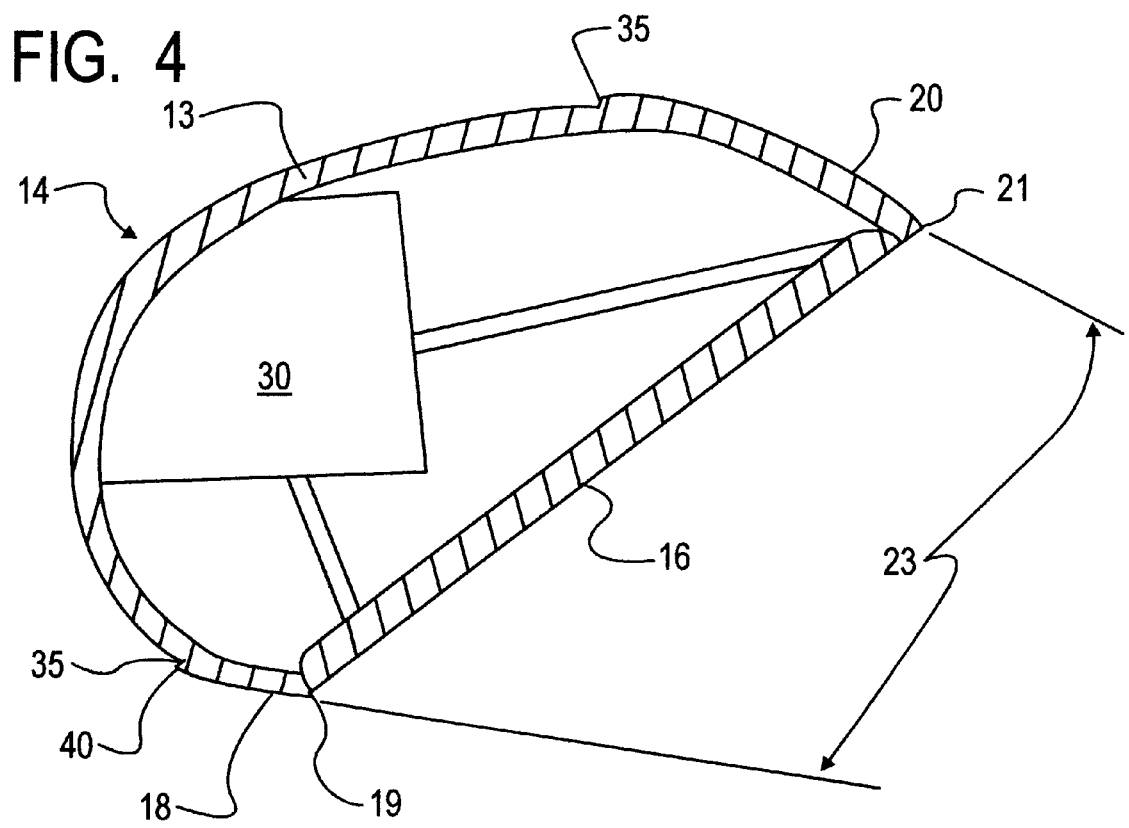
FIG. 4 is an enlarged cross section view of the embodiment of the passenger side mirror in which the side walls converge to the rear.

The mirror includes a housing 14 that includes an aerodynamically shaped exterior shell 13 that terminates in a generally rectangular peripheral rearward trailing edge 15. The housing 14 is mounted on the vehicle 26 by a mounting assembly 12 such that the housing 14 is stationary relative to the vehicle. An adjustable assembly 30 including a rearwardly facing reflecting surface 16 is mounted within the housing 14 such that the reflecting surface 16 can be adjusted relative to the housing 14. The adjustment of the reflecting surface 16 relative to the housing 14 can be done remotely by the operator from within the vehicle 26. A mirror of this general type is shown in U.S. Pat. No. 5,179,470 which is hereby, by reference, made a part of this disclosure. The aerodynamically shaped exterior shell 13 is contoured to minimize the drag that is created by the mirror and includes relatively flat inner and outer side walls 18 and 20 respectively. The inside wall 18 is the vehicle-side side wall and the outer side wall 20 is the outside-side side wall. The trailing edges 19 and 21 of the inner and outer side walls 18 and 20 respectively form the vertically extending sections of the rearward trailing edge 15. The rearward trailing edge 15 lies in a generallyvertical plane. The relatively flat innerand outer side walls 18 and 20 can be either parallel to the direction of air flow past the mirror 11 as indicated at 22 or closing as indicated at 23. FIG. 4 illustrates the embodiment of the aerodynamic vehicle mirror in which the side walls 18 and 20 converge toward the rear as indicated at 23.

Figure 3:
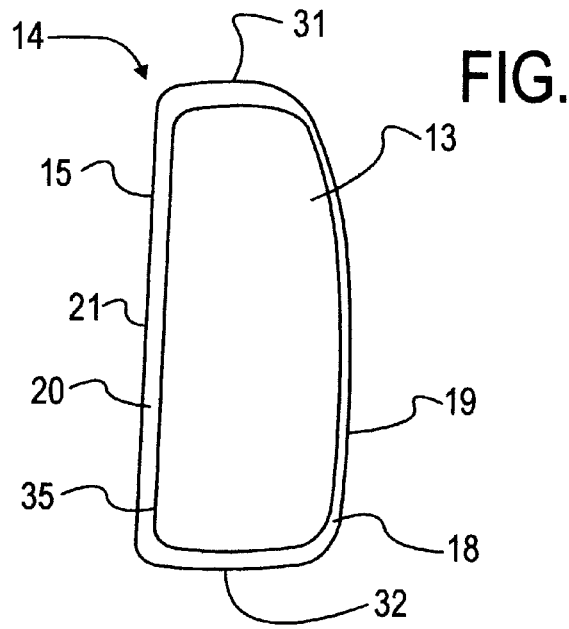
FIG. 3 is an enlarged front view of the driver side mirror seen in FIG. 1.

As the vehicle travels down the highway, a thin boundary layer of air will flow smoothly over the exterior surface of the aerodynamically shaped exterior shell 13. The thin boundary layer is laminar flow, which results in low drag or resistance. The low drag laminar flow is a result of the aerodynamic shape of the exterior surface. The reflecting surface 16 of the mirror forms a flat rear surface for the mirror head which results in an abrupt halt to the smooth aerodynamic surface of the mirror head. As best seen in FIG. 3 the smooth aerodynamic surface terminates along a generally rectangular peripheral trailing edge 15. Verticallyextending trailing edges 19 and 21, which comprise the largest components of the rectangular peripheral trailing edge 15, are the trailing edges of the flat inner and outer side walls 18 and 20 respectively. The abrupt termination of the smooth aerodynamic surface, that the laminar flow was following, causes the laminar flow to change to turbulent flow. This turbulent flow separates from the aerodynamic surface that the laminar flow was following. The separation may occur at or upstream from the trailing vertically extending edges, 19 and 21, of the mirror head. The point of separation is dependent upon the shape of the mirror head as well as other conditions such as the direction and speed of the free stream airflow. The term "free stream airflow" refers to the movement of air relative to the side of the vehicle. The point of separation can be best located by testing and observing the aerodynamically shaped exterior shell 13, in a wind tunnel. When the airflow separates from the aerodynamic surfaces that the airflow was following, forward of the trailing edges, without the boundary layer control device of this invention, because of upstream boundary layer separation, the result is a larger wake trailing downstream of the mirror head creating a large drag force which diminishes the value of the low drag that was gained as a result of the aerodynamically shaped exterior shape shell 13.

The invention includes a boundary layer control device that consists of a trip strip 35 that is formed on the exterior surface of the exterior shell 13 just upstream of the separation point where the laminar boundary layer would separate from the surface rather than transition to a more stable turbulent boundary layer. The trip strip forces the laminar boundary layer to transition to a turbulent boundary layer which in effect reenergizes the boundary layer. The turbulent boundary layer is more stable and has more energy which will enable it to adhere to the surface longer. As a result, separation is reduced or eliminated which in turn reduces the turbulentwake drag that would have been present, absent the boundary layer control device of this invention. The complete extent of the trip strip 35 is best seen in FIG. 3. Trip strip 35 generally follows the shape of the rectangular peripheral rearward trailing edge 15. It should be noted that although the vertically extending trailing edges 19 and 21 comprise a major portion of rectangular peripheral trailing edge 15 there are upper 31 and lower 32 trailing edge sections that join the edges 19 and 20. The trip strip is located slightly forward of the point of separation of the laminar air flow. The trip strip 35 is formed by a forward facing step 40 that is generally perpendicular to the direction of air flow past the mirror. The height of the forward facing step 40 is significantly less than the thickness of he boundary layer of laminar flow in this area. The height of the boundary layer is dependent upon the aerodynamic shape of the exterior shell 13 and the speed of the air flowing past the mirror head and thus varies. The optimum height of the forward facing step 40 varies with the speed of the vehicle 26. Since the height of the facing step 40 of the trip strip of this invention is intended to be fixed rather than adjustable the height of the forward facing step 40 has after wind tunnel testing been fixed at 0.025 inches. Manufacturing considerations as well as normal highway driving speeds were considered in fixing the height of the forward facing step 40 at 0.0250 inches. However, the height of the step 40 could be within a range of 0.0100 inches to 0.0500 inches.

Figure 2:
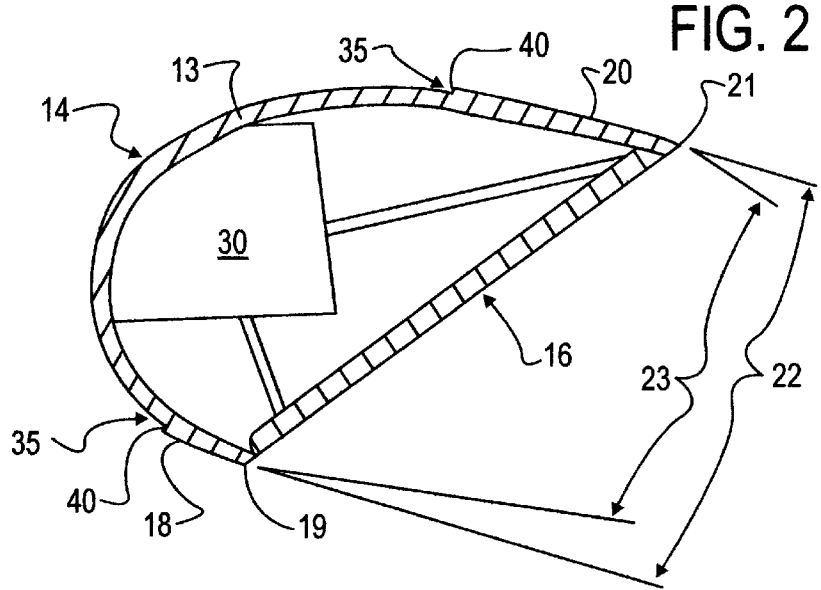
FIG. 2 is an enlarged cross section view of the passenger side mirror seen in FIG. 1.

When the inboard 18 and outboard 20 surfaces of the aerodynamically shaped exterior shell 13 are parallel to the direction of air flow immediately prior to their trailing edges 19 and 21, a moderate turbulent wake will extend rearward from the point of separation. In this situation separation will occur a corresponding relatively moderate distance upstream from the trailing edges. Thus, if the aerodynamically shaped exterior shell 13 has inboard 18 and outboard 20 surfaces that are parallel to the direction of air flow the trip strip would be located at a relatively moderate distance upstream from the trailing edges 19 and 21. For example, in the preferred embodiment illustrated in FIG. 2 the forward facing step 40 is about 6 inches from the trailing edge 21 and about 3 inches from the trailing edge 19.

When the surfaces are converging immediately prior to their trailing edges, relative to the direction of the free stream airflow, a moderate turbulent wake will again extend rearward from the point of separation. In this situation, separation will occur at the point of initiation of the converging surface or slightly rear of that point but not necessarily at the same location as with parallel surfaces. Thus, if the aerodynamically shaped exterior shell 13 has inboard 18 and outboard 20 surfaces that are converging relative to the direction of air flow the trip strip would be located at a relatively moderate distance upstream from the trailing edges 19 and 21.

Thus, a turbulent wake develops from the point of the separation and results in high drag forces. Although the frictional drag forces are larger as a result of the boundary layer remaining attached longer, the net drag is reduced because of a significantly reduced turbulent wake size, considerably less than the drag forces that would have been encountered absent the trip strip 35.

What is claimed is:

1. In a vehicle mirror, of a vertically elongated generally rectangular type having a housing comprising a forward facing aerodynamically shaped exterior shell that terminates in a generally rectangular peripheral rearward trailing edge, and a rearwardly facing reflecting surface mounted in said housing, such that when a vehicle is moving in the forward direction there is laminar air flow over the forward facing aerodynamically shaped exterior shell, toward the rear of the vehicle, which laminar air flow separates from the aerodynamically shaped exterior shell at separation points forward of the rearward trailing edge, wherein the improvement comprises:

said aerodynamically shaped exterior shell including a vehicle-side side wall adapted to be disposed adjacent the vehicle, and an outside-side side wall adapted to be disposed away from the vehicle;

a boundary layer control device integral with and extending directly from said vehicle-side and outside-side side walls, such that there is no air space between said aerodynamically shaped exterior shell and said boundary layer control device, said boundary layer control device located slightly upstream of the separation points for the laminar air flow.

2. The invention as set forth in claim 1 wherein said generally rectangular peripheral rearward trailing edge lies in a generally vertical plane.

3. The invention as set forth in claim 2 wherein said rearward trailing edges of said vehicle-side and outside-side side walls extend in a generally vertical direction.

4. The invention as set forth in claim 3 wherein said vehicle-side and outside-side side walls lie in planes that are substantially parallel to each other.

5. The invention as set forth in claim 4 wherein said boundary layer control device comprises of a trip strip that includes a forward facing step that is generally perpendicular to the laminar air flow.

6. The invention as set forth in claim 5 wherein said forward facing step is approximately 0.025 inches high.

7. The invention as set forth in claim 3 wherein said vehicle-side and outside-side side walls lie in planes that converge toward the rear of the vehicle.

8. The invention as set forth in claim 7 wherein said boundary layer control device comprises of a trip strip that includes a forward facing step that is generally perpendicular to the laminar air flow.

9. The invention as set forth in claim 8 wherein said forward facing step is approximately 0.025 inches high.

10. The invention as set forth in claim 3 wherein said boundary layer control device comprises of a trip strip that includes a forward facing step that is generally perpendicular to the laminar air flow.

11. The invention as set forth in claim 10 wherein said forward facing step is approximately 0.025 inches high.

12. The invention as set forth in claim 2 wherein said vehicle-side and outside-side side walls lie in planes that are substantially parallel to each other.

13. The invention as set forth in claim 2 wherein said vehicle-side and outside-side side walls lie in planes that converge toward the rear of the vehicle.

14. The invention as set forth in claim 13 wherein said boundary layer control device comprises of a trip strip that includes a forward facing step that is generally perpendicular to the laminar air flow.

15. The invention as set forth in claim 14 wherein said forward facing step is approximately 0.025 inches high.

16. The invention as set forth in claim 1 wherein said rearward trailing edges of said vehicle-side and outside-side side walls extend in a generally vertical direction.

17. The invention as set forth in claim 16 wherein said boundary layer control device comprises of a trip strip that includes a forward facing step that is generally perpendicular to the laminar air flow.

18. The invention as set forth in claim 17 wherein said forward facing step is approximately 0.025 inches high.

19. The invention as set forth in claim 1 wherein said vehicle-side and outside-side side walls lie in planes that are substantially parallel to each other.

20. The invention as set forth in claim 19 wherein said boundary layer control device comprises of a trip strip that includes a forward facing step that is generally perpendicular to the laminar air flow.

21. The invention as set forth in claim 20 wherein said forward facing step is approximately 0.025 inches high.

22. The invention as set forth in claim 1 wherein said vehicle-side and outside-side side walls lie in planes that converge toward the rear of the vehicle.

23. The invention as set forth in claim 22 wherein said boundary layer control device comprises of a trip strip that includes a forward facing step that is generally perpendicular to the laminar air flow.

24. The invention as set forth in claim 23 wherein said forward facing step is approximately 0.025 inches high.

25. The invention as set forth in claim 1 wherein said boundary layer control device comprises of a trip strip that includes a forward facing step that is generally perpendicular to the laminar air flow.

26. The invention as set forth in claim 25 wherein said forward facing step is approximately 0.025 inches high.

27. The invention as set forth in claim 2 wherein said boundary layer control device comprises of a trip strip that includes a forward facing step that is generally perpendicular to the laminar air flow.

28. The invention as set forth in claim 27 wherein said forward facing step is approximately 0.025 inches high.

29. An aerodynamic vehicle mirror including:

a vertically elongated rectangular shaped shell having an aerodynamic shaped surface and a peripheral trailing edge such that when a vehicle is moving in the forward direction there is laminar air flow over the aerodynamic shaped surface toward the rear of the vehicle;

said shell including a vehicle-side side wall adapted to be disposed adjacent to but spaced from the vehicle and an outside-side side wall adapted to be disposed away from the vehicle;

a reflecting surface disposed in said shell and facing the rear of the vehicle;

a boundary layer control device integral with and extending directly from said vehicle-side and outside-side side walls, such that there is no air space between said vertically elongated shaped shell and said boundary layer control device, said boundary layer control device causes said laminar air flow to separate from said vertically elongated rectangular shaped shell at separation points forward from said peripheral trailing edge, said boundary layer control device located slightly upstream of the separation points for the larninar air flow.

30. The invention as set forth in claim 29 wherein said vehicle-side and outside-side side walls are generally parallel to the laminar air flow and terminate in vertically extending trailing edges.

31. The invention as set forth in claim 30 wherein said boundary layer control device comprises of a trip strip that includes a forward facing step that is generally perpendicular to the air flow.

32. The invention as set forth in claim 29 wherein said vehicle-side and outside-side side walls converge to the rear of the vehicle and terminate in vertically extending trailing edges.

33. The invention as set forth in claim 32 wherein said boundary layer control device comprises of a trip strip that includes a forward facing step that is generally perpendicular to the laminar air flow.

34. The invention as set forth in claim 29 wherein said boundary layer control device comprises of a trip strip that includes a forward facing step that is generally perpendicular to the laminar air flow.

35. An aerodynamic vehicle mirror head including a housing, said housing having an aerodynamically shaped forward facing outer surface including an inside side wall adapted to be disposed adjacent a vehicle and a outside side wall on the side of said mirror head opposite from said inside side wall, said side walls having trailing edges;

said housing adapted to be mounted on the vehicle such that when the vehicle is moving in the forward direction there is laminar air flow over said aerodynamically shaped forward facing outer surface, toward said trailing edges and the rear of the vehicle, which laminar air flow separates from the aerodynamically shaped exterior shell at separation points forward of said trailing edges;

a reflecting surface engaged in a rearward portion of said housing; and a boundary layer control device integral with and extending directly from said vehicle-side and outside-side side walls, such that there is no air space between said aerodynamically shaped forward facing outer surface and said boundary layer control device, said boundary layer control device located slightly upstream of the separation points for the laminar air flow.

36. The invention as set forth in claim 35 wherein said boundary layer control device comprises of a trip strip that includes a forward facing step that is generally perpendicular to the laminar air flow.

37. An exterior rear-view mirror for motor vehicles, having a streamlined housing including inboard and outboard surfaces and a mirror adjustable therein, said streamlined housing having an abrupt halt along an edge;

said rear-view mirror adapted to be mounted on a vehicle such that when the vehicle is moving in the forward direction there is laminar air flow over said streamlined housing, toward said edge such that said edge becomes the trailing edge, said laminar air flow will, as a result of said abrupt halt in said streamlined housing and in accordance with aerodynamic principals, separates from the streamlined housing at separation points forward of said trailing edge;

and wherein the flow around the rear-view mirror is improved by a trip strip boundary layer control device located on the streamlined housing in the form of a forward facing step that is substantially perpendicular to the laminar air flow, said trip strip being integral with and extending directly from said streamlined housing such that there is no air space between said streamlined housing and said trip strip boundary layer, said trip strip boundary layer control device located on said inboard and outboard surfaces of streamlined housing just upstream of the separation point for laminar air flow past said rear-view mirror.

38. The invention as set forth in claim 37 wherein said inboard and outboard surfaces of said housing lie in planes that are substantially parallel to each other.

39. The invention as set forth in claim 37 wherein said inboard and outboard surfaces of said housing lie in planes that converge toward the rear.

* * * * *